US012749716B2

(12) United States Patent
Kang et al.

(10) Patent No.: US 12,749,716 B2
(45) Date of Patent: Sep. 29, 2026

(54) STACK TYPE JELLY ROLL FOR SECONDARY BATTERY, BATTERY CELL INCLUDING THE SAME, BATTERY PACK INCLUDING THE SAME, AND METHOD OF MANUFACTURING THE SAME

(71) Applicant: SK INNOVATION CO., LTD., Seoul (KR)

(72) Inventors: Hee Gyoung Kang, Daejeon (KR); Tae Il Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 16 days.

(21) Appl. No.: 16/742,359

(22) Filed: Jan. 14, 2020

(65) Prior Publication Data

US 2020/0227787 A1 Jul. 16, 2020

(30) Foreign Application Priority Data

Jan. 14, 2019 (KR) ........................ 10-2019-0004605

(51) Int. Cl.

| | |
|---|---|
| ***H01M 10/04*** | (2006.01) |
| ***H01M 4/70*** | (2006.01) |
| ***H01M 10/0583*** | (2010.01) |
| ***H01M 50/403*** | (2021.01) |
| ***H01M 50/538*** | (2021.01) |

(52) U.S. Cl.

CPC ......... *H01M 10/0583* (2013.01); *H01M 4/70* (2013.01); *H01M 50/403* (2021.01); *H01M 50/538* (2021.01)

(58) Field of Classification Search

CPC ........... H01M 10/0431; H01M 10/045; H01M 10/0459; H01M 10/0583; H01M 10/0587; H01M 4/70; H01M 50/466; H01M 2004/025; H01M 50/40; H01M 50/46; H01M 50/471; H01M 10/04;

(Continued)

(56) References Cited

U.S. PATENT DOCUMENTS 6,461,759 B1 * 10/2002 Miller ............... H01M 10/0431 429/185
2005/0048361 A1 3/2005 Wang et al.
2014/0050958 A1 * 2/2014 Kwon ............... H01M 10/0587 429/94

(Continued)

FOREIGN PATENT DOCUMENTS

CN 101931106 A 12/2010
CN 104011929 A 8/2014

(Continued)

OTHER PUBLICATIONS

Ryu et al; "Cell stack assembly for secondary battery and stacking method of the same"; Machine translation of KR 20120118759 A obtained from Google Patents (Year: 2011).*

(Continued)

*Primary Examiner* — Allison Bourke
*Assistant Examiner* — Charlene Bermudez
(74) *Attorney, Agent, or Firm* — IP&T GROUP LLP

(57) ABSTRACT

The present invention relates to a stack type jelly roll for a secondary battery including a cathode, an anode, and a separator. More particularly, the present invention relates to a stack type jelly roll for a secondary battery having a hybrid form of a winding stack manner and a zigzag type stack manner, and a method of manufacturing the same.

8 Claims, 14 Drawing Sheets

(58) Field of Classification Search
CPC ......... H01M 10/0468; H01M 10/0481; H01M 10/049; H01M 16/00
See application file for complete search history.

(56) References Cited

U.S. PATENT DOCUMENTS

| | | | | |
|---|---|---|---|---|
| 2014/0099525 | A1 † | 4/2014 | Kwon | |
| 2014/0342215 | A1 * | 11/2014 | Kwon | H01M 10/0583 429/144 |
| 2017/0279158 | A1 * | 9/2017 | Cho | H01M 10/0468 |
| 2019/0020009 | A1 * | 1/2019 | Watanabe | H01M 50/466 |

FOREIGN PATENT DOCUMENTS

| | | | | |
|---|---|---|---|---|
| CN | 105489942 A | 4/2016 | | |
| KR | 10-0313119 | 11/2001 | | |
| KR | 20120118759 A | * 4/2011 | | H01M 10/04 |
| KR | 10-2014-0035646 A | 3/2014 | | |
| KR | 20140128512 A | 11/2014 | | |
| KR | 10-1684325 B1 | 12/2016 | | |
| KR | 10-2018-0001458 A | 1/2018 | | |
| WO | 2014042424 A1 | 3/2014 | | |

OTHER PUBLICATIONS

Office action Issued by the CNIPA for CN Patent Application 202010032027.4, dated Jun. 15, 2023.

Office Action for the Korean Patent Application No. 10-2019-0004605 issued by the Korean Intellectual Property Office on Jan. 23, 2024.

* cited by examiner
† cited by third party

STACK TYPE JELLY ROLL FOR SECONDARY BATTERY, BATTERY CELL INCLUDING THE SAME, BATTERY PACK INCLUDING THE SAME, AND METHOD OF MANUFACTURING THE SAME

CROSS-REFERENCE TO RELATED APPLICATIONS

This application claims priority under 35 U.S.C. § 119 to Korean Patent Application No. 10-2019-0004605, filed on Jan. 14, 2019, in the Korean Intellectual Property Office, the disclosure of which is incorporated herein by reference in its entirety.

TECHNICAL FIELD

The following disclosure relates to a jelly roll for a secondary battery including a cathode, an anode, and a separator. More particularly, the following disclosure relates to a stack type jelly roll for a secondary battery having a hybrid form of a winding stack manner and a zigzag type stack manner, and a method of manufacturing the same.

BACKGROUND

A secondary battery is configured in a form in which a cell stack formed by sequentially stacking a cathode (positive electrode), a separator, an anode (negative electrode) is immersed in an electrolyte solution. A manner of manufacturing an inner cell stack of the secondary battery as described above is mainly divided into two manners. In a case of a small secondary battery, a manner (winding manner) of manufacturing an inner cell stack in a form of a jelly roll 10 by disposing anodes 1 and cathodes 2 on a separator 3 and then winding the separator 3 as illustrated in FIG. 1 is mainly used, and in a case of a medium or large secondary battery having a more electrical capacity, a manner of manufacturing an inner cell stack by stacking an anode, a cathode, and a separate in an appropriate sequence is mainly used.

There are several manners of manufacturing an inner cell stack of the secondary battery in a stack manner. Among them, in a Z-folding (also referred to as zigzag folding or accordion folding) manner, a cell stack 20 is formed by folding a separator 6 in a zigzag form and stacking anodes 4 and cathodes 5 in a form in which the anodes 4 and the cathodes 5 are alternatively inserted between folded portions of the separator 6, as illustrated in FIG. 2. The inner cell stack 20 of the secondary battery formed in the Z-folding stack form as described above is disclosed in various related arts such as Korean Patent No. 0313119, U.S. Patent Publication No. 2005/0048361, and the like.

Meanwhile, in the jelly roll 10 having the winding form illustrated in FIG. 1, the separator 3 is wound, and the separator 3 is thus accumulated on side surfaces of the jelly roll 10. Therefore, there is a disadvantage that a width of the jelly roll 10 is increased, such that an energy density is decreased and an amount of used separator is increased.

In addition, in a case of the cell stack 20 having the Z-folding form illustrated in FIG. 2, there is an advantage that a width of the cell stack 20 is decreased as compared with the winding manner, such that an energy density is increased and an amount of used separator is decreased, but there is a disadvantage that a process speed is relatively slow and alignment between electrodes at the time of stacking the anode 4 and the cathode 5 is unstable.

Therefore, it has been demanded to develop a cell stack for a secondary battery that may minimize the disadvantages of the above two manners while maintaining the advantages of the above two manners.

SUMMARY

An embodiment of the present invention is directed to providing a stack type jelly roll having a form in which a winding jelly roll and a Z-folding cell stack are appropriately combined with each other and providing a stack type jelly roll for a secondary battery in which electrodes are stacked in a winding form at the center and an outer side of a cell stack and electrodes are stacked in a Z-folding form between the center and the outer side of the cell stack, and a method of manufacturing the same.

In one general aspect, a stack type jelly roll for a secondary battery includes: a first stack formed at a predetermined region from a center to an outer side and including a 1-1-th electrode which is any one of a cathode and an anode, a 2-1-th electrode which is the other of the cathode and the anode, and a first separator having a winding form; and a second stack formed at a predetermined region from an outermost side of the first stack to an outer side and including a 1-2-th electrode which is any one of a cathode and an anode, a 2-2-th electrode which is the other of the cathode and the anode, and a second separator having a form folded in a Z shape.

The stack type jelly roll for a secondary battery may further include a third stack formed from an outermost side of the second stack to an outermost side of the stack type jelly roll and including a 1-3-th electrode which is any one of a cathode and an anode, a 2-3-th electrode which is the other of the cathode and the anode, and a third separator having a winding form.

The first stack may be configured by performing winding based on a 1-1-th electrode disposed at a center of the first separator in a state where a plurality of 1-1-th electrodes are disposed on one side of an upper surface of the first separator so as to be spaced apart from each other by a predetermined distance and a plurality of 2-1-th electrodes are disposed on the other side of a lower surface of the first separator so as to be spaced apart from each other by a predetermined distance.

The first stack may be configured by once or more performing a process of winding the first separator in a state where the 1-1-th electrode is disposed on an upper surface of the first separator and the 2-1-th electrode is disposed on a lower surface of the first separator.

A thickness of the second stack in a stack direction may be larger than or equal to the sum of thicknesses of the first stack and the third stack in the stack direction.

The third stack may be configured by performing winding based on a 1-3-th electrode disposed at a center of the third separator in a state where a plurality of 1-3-th electrodes are disposed on one side of an upper surface of the third separator so as to be spaced apart from each other by a predetermined distance and a plurality of 2-3-th electrodes are disposed on the other side of a lower surface of the third separator so as to be spaced apart from each other by a predetermined distance, and the 2-3-th electrode may be disposed at an outermost side of the third stack.

In another general aspect, a battery cell for a secondary battery includes the stack type jelly roll for a secondary battery described above.

In still another general aspect, a battery pack for a secondary battery includes the stack type jelly roll for a secondary battery described above.

In yet still another general aspect, a method of manufacturing a stack type jelly roll for a secondary battery includes: forming a first stack by winding a first separator in a state where first and second electrodes are disposed on the first separator; and forming a second stack by folding a second separator formed outside the first stack in a z shape in a state where first and second electrodes are disposed on the second separator.

The method of manufacturing a stack type jelly roll for a secondary battery may further include forming a third stack by winding a third separator formed outside the second stack in a state where first and second electrodes are disposed on the third separator.

The first to third separators may be connected to be continuously supplied, and at the time of manufacturing the first stack or the third stack, the first separator or the third separator may be configured to be supplied in both directions of a length direction and be wound based on a first electrode disposed at a center of the stack type jelly roll in a state where a plurality of first electrodes are disposed on one side of an upper surface of the first separator or the third separator so as to be spaced apart from each other by a predetermined distance and a plurality of second electrodes are disposed on the other side of a lower surface of the first separator so as to be spaced apart from each other by a predetermined distance.

The first to third separators may be connected to be continuously supplied, and at the time of manufacturing the first stack or the third stack, the first separator or the third separator may be configured to be supplied in both directions of a length direction and a process of winding the first separator or the third separator in a state where the first electrode is disposed on an upper surface of the first separator and the second electrode is disposed on a lower surface of the first separator may be repeated.

The second separator may be connected to be continuously supplied, and at the time of manufacturing the second stack, the second separator may be configured to be supplied in both directions of a length direction and a process of winding the second separator in a state where the first electrode is disposed on an upper surface of the second separator and the second electrode is disposed on a lower surface of the second separator may be performed once or more.

In the winding of the second separator, a process of winding the second separator in one direction after the first electrode and the second electrode are disposed and a process of winding the second separator in the other direction after the first electrode and the second electrode are disposed may be alternately performed.

In a case where the first electrode is disposed at a center of the stack type jelly roll, a pair of second electrodes may be disposed at an outermost side of the stack type jelly roll.

The stack type jelly roll may be stacked so that anodes are positioned at an uppermost layer and a lowermost layer.

DETAILED DESCRIPTION OF EMBODIMENTS

Hereinafter, an exemplary embodiment of a stack type jelly roll for a secondary battery according to the present invention as described above will be described in detail with reference to the drawings.

Figure 1:
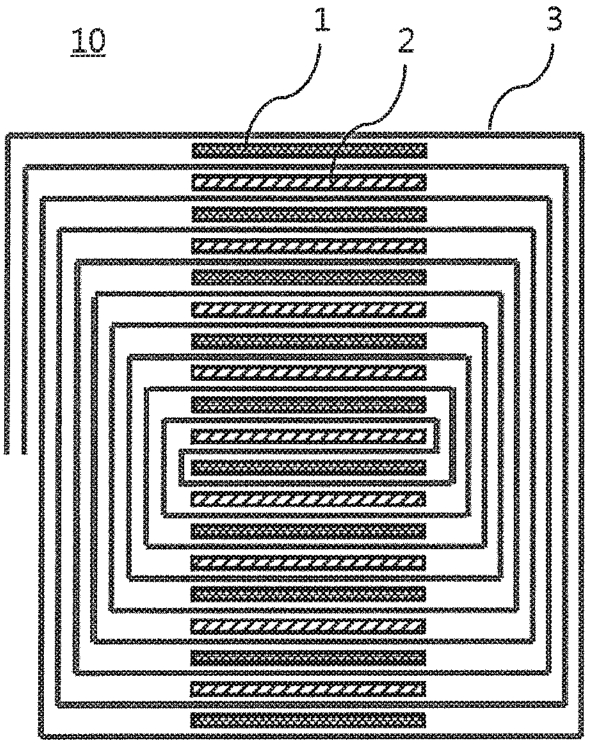
FIG. 1 is a side schematic view of a jelly roll manufactured in a general winding manner.
Figure 2:
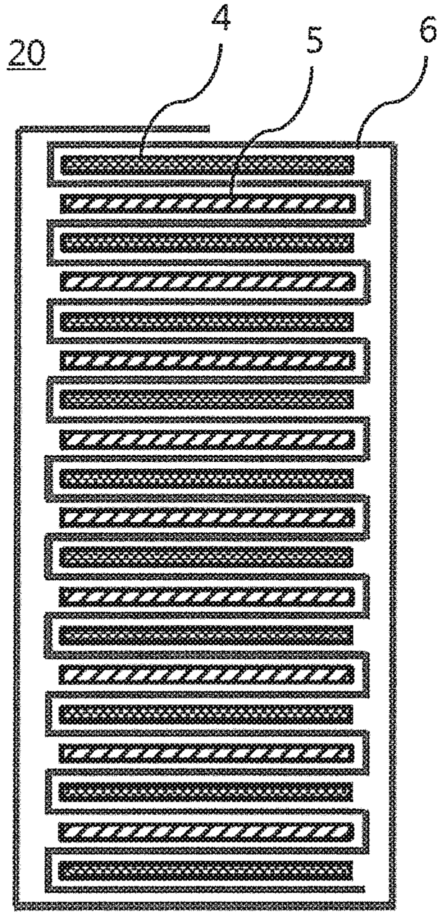
FIG. 2 is a side schematic view of a cell stack manufactured in a general Z-folding manner.
Figure 3:
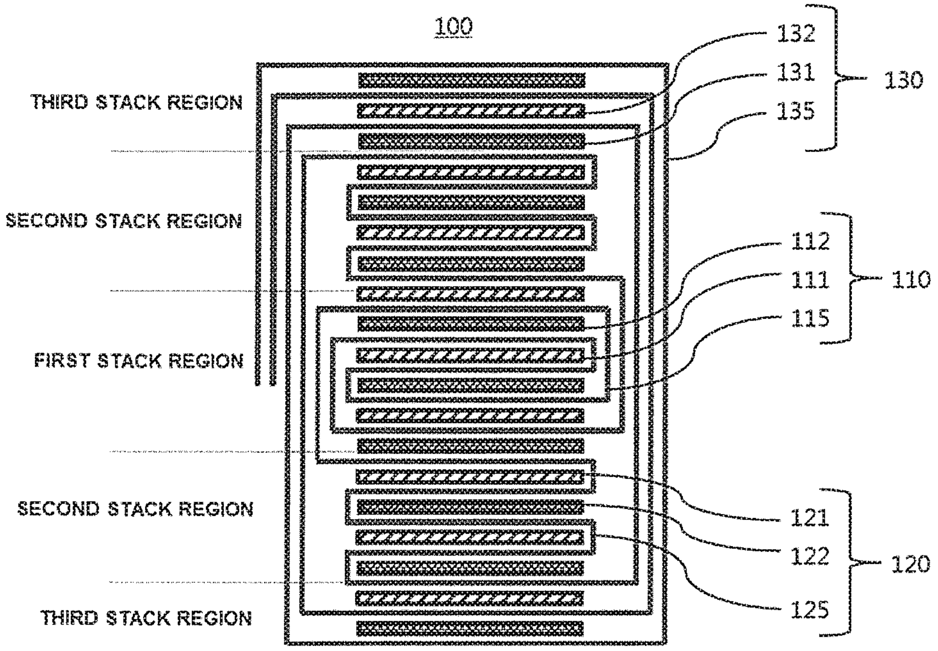
FIG. 3 is a side schematic view of a stack type jelly roll according to an exemplary embodiment of the present invention.

In FIG. 3, a side schematic view of a stack type jelly roll 100 (hereinafter, referred to as a 'jelly roll') for a secondary battery according to an exemplary embodiment of the present invention is illustrated.

Referring to FIG. 3, a jelly roll 100 according to the present invention is configured to basically include first electrodes 111, 122, and 132, second electrodes 112, 121, and 131, and separators 115, 125, and 135. In this case, the separators 115, 125, and 135 are continuously interposed, have unit lengths enough to surround the first electrodes 111, 122, and 132 or the second electrodes 112, 121, and 131, and are formed in a structure in which they are bent inward per unit length and continuously surround the first electrodes 111, 122, and 132 or the second electrodes 112, 121, and 131 from the first electrodes 111, 122, and 132 or the second electrodes 112, 121, and 131 of central portions to the first electrodes 111, 122, and 132 or the second electrodes 112, 121, and 131 of the outermost sides.

The first electrodes 111, 122, and 132 may be formed of a monocell, which is any one of an anode and a cathode, and the second electrodes 112, 121, and 131 may be formed of a monocell, which is the other of the anode and the cathode. As another exemplary embodiment, the first electrodes 111, 122, and 132 may be any one of bi-cells in which anode/separator/cathode/separator/anode or cathode/separator/anode/separator/cathode are sequentially stacked, and the second electrodes 112, 121, and 131 may be the other of the bi-cells in which anode/separator/cathode/separator/anode or cathode/separator/anode/separator/cathode are sequentially stacked. In the present exemplary embodiment, for convenience, the first electrodes 111, 122, and 132 are defined as an anode, and the second electrodes 112, 121, and 131 are defined as a cathode.

In this case, the jelly roll 100 according to an exemplary embodiment of the present invention has the following characteristic configuration to supplement the disadvantages of the existing winding-type jelly roll and the disadvantages of the existing Z-folding type cell stack.

The jelly roll 100 may be configured to be divided into three portions from the center of the jelly roll 100 to the outermost side thereof. That is, a first stack 110 may be formed at a predetermined portion from the center of the jelly roll 100 to an outer side thereof, a third stack 130 may be formed at a predetermined portion from the outermost side of the jelly roll 100 to an inner side thereof, and a second stack 120 may be formed between the first stack 120 and the third stack 130.

The first stack 110 may be formed at the predetermined portion from the center of the jelly roll 100 to an outer side thereof, and may be configured to include a 1-1-th electrode 111, 2-1-th electrodes 112, and a first separator 115. The first stack 110 may be configured so that the 1-1-th electrode 111 is disposed at the center of the first stack 110, a pair of 2-1-th electrodes 112 are disposed above and below the 1-1-th electrode 111, respectively, and the first separator 115 is disposed between the 1-1-th electrode 111 and the 2-1-th electrodes 112. In addition, a pair of 1-1-th electrodes 111 may be additionally disposed above the 2-1-th electrode 112 positioned above the 1-1-th electrodes 111 and below the 2-1-th electrode 112 positioned below the 1-1-th electrodes 111.

It has been illustrated in FIG. 3 that two first and second electrodes are alternately disposed above the 1-1-th electrode 111 disposed at the center and three first and second electrodes are alternately disposed below the 1-1-th electrode 111 disposed at the center, but the numbers of first and second electrodes may be increased or decreased depending on a size of the jelly roll 100.

In addition, the first separator 115 may be formed in a structure in which it continuously surrounds the first electrodes 111 and the second electrodes 112, and may be disposed in a winding form between the first electrodes 111 and the second electrodes 112. That is, the first stack 110 may be configured by winding the first separator 115 clockwise or counterclockwise in a state in which the first electrodes 111 and the second electrodes 112 are alternately disposed at a predetermined interval on one surface or the other surface of the first separator 115. A process of forming the first stack 100 will be described in detail in a method of manufacturing the jelly roll 100 according to an exemplary embodiment of the present invention.

The first stack 110 is positioned at the center of the jelly roll 100, and the first separator 115 is disposed in a winding manner, such that alignment of the electrodes is easy. Therefore, the first stack 110 serves to balance an entire electrode array at the time of manufacturing the jelly roll 100.

The second stack 120 may be formed at predetermined portions above and below the outermost side of the first stack 110, and may be configured to include 1-2-th electrodes 121, 2-2-th electrodes 122, and a second separator 125. In a case where the first electrode is formed at the outermost side of the first stack 110, the 2-2-th electrode 122 may be disposed at the innermost side of the second stack 120, and in a case where the second electrode is formed at the outermost side of the first stack 110, the 1-2-th electrode 121 may be disposed at the innermost side of the second stack 120.

The 2-2-th electrodes 122 and the 1-2-th electrodes 121 may be alternately disposed below the 1-2-th electrode 121 disposed at the innermost side of a lower side of the second stack 120 when viewed in FIG. 3, and the 1-2-th electrodes 121 and the 2-2-th electrodes 122 may be alternately disposed above the 2-2-th electrode 122 disposed at the innermost side of an upper side of the second stack 120 when viewed in FIG. 3. In addition, the second separator 125 may be disposed between the first 1-2-th electrodes 121 and the 2-2-th electrodes 122.

It has been illustrated in FIG. 3 that four first and second electrodes are alternately disposed above the first stack 110 and four first and second electrodes are alternately disposed below the first stack 110, but the numbers of first and second electrodes may be increased or decreased depending on a size of the jelly roll 100.

In addition, the second separator 125 may be formed in a structure in which it continuously surround the first electrodes 121 and the second electrodes 122, and may be folded in a Z form, such that the first electrodes 121 or the second electrodes 122 may be inserted or fixed between a pair of second separators 125 neighboring to each other in a height direction to configure the second stack 120.

A process of manufacturing the second stack 120 is simple, such that the number of times of stack is increased, process efficiency is improved, and as compared with a manner of manufacturing a stack by winding the separator, an increase in a thickness of side surfaces of the stack due to the separator may be prevented, an amount of used separator may be decreased, and an energy density of the jelly roll may be increased.

Therefore, a large portion of the jelly roll 100 according to an exemplary embodiment of the present invention may be formed of the second stack 120, and in a case when the number of stacks of the jelly roll 100 needs to be increased, the number of stacks of the second stack 120 may be increased to satisfy a design condition of the jelly roll 100.

The third stack 130 may be formed at predetermined portions above and below the outermost side of the second stack 120, and may be configured to include 1-3-th electrodes 132, 2-3-th electrodes 131, and a third separator 135. In a case where the first electrode is formed at the outermost side of the second stack 120, the 2-3-th electrode 131 may be disposed at the innermost side of the third stack 130, and in a case where the second electrode is formed at the outermost side of the second stack 120, the 1-3-th electrode 132 may be disposed at the innermost side of the third stack 130.

In the third stack 130, when viewed in FIG. 3, the 2-3-th electrode 131 is disposed at the innermost side of an upper side portion of the jelly roll 100, and the 1-3-th electrode 132 is disposed at the innermost side of a lower side portion of the jelly roll 100. A 1-3-th electrode 132 may be additionally disposed above the 2-3-th electrode 131 positioned at the innermost side of the upper side portion of the jelly roll 100, and a 2-3-th electrode 131 may be additionally disposed below the 1-3-th electrode 132 positioned at the innermost side of the lower side portion of the jelly roll 100.

It has been illustrated in FIG. 3 that three first and second electrodes are alternately disposed above the second stack 120 and two first and second electrodes are alternately disposed below the second stack 120, but the numbers of first and second electrodes may be increased or decreased depending on a size of the jelly roll 100.

In addition, the third separator 135 may be formed in a structure in which it continuously surrounds the first electrodes 132 and the second electrodes 131, and may be disposed in a winding form between the first electrodes 132 and the second electrodes 131. That is, the third stack 130 may be configured by winding the third separator 135 clockwise or counterclockwise in a state in which the first electrodes 132 and the second electrodes 131 are alternately disposed at a predetermined interval on one surface or the other surface of the third separator 135. A process of forming the third stack 100 will be described in detail in a method of manufacturing the jelly roll 100 according to an exemplary embodiment of the present invention.

The third stack 130 is positioned at the outermost side of the jelly roll 100, and has a feature that the third separator 135 is disposed in a winding manner for the purpose of structural stabilization of the jelly roll 100 and final alignment of electrodes. The third stack 130 may include one or more electrodes disposed outside the outermost side of the second stack 120, and a pair of electrodes disposed at the outermost side may be disposed as the same electrode.

It has been illustrated in the present exemplary embodiment that the third stack 130 includes one or more electrodes disposed outside the outermost side of the second stack 120, but only the third separator 135 may be disposed in a winding form without disposing electrodes in the third stack 130. In this case, a pair of electrodes disposed at the outermost side of the second stack 120 may be disposed as the same electrode.

Meanwhile, the jelly roll 100 may be formed so that a thickness of the second stack 120 in a stack direction is larger than the sum of thicknesses of the first stack 110 and the third stack 130 in the stack direction. This is to decrease a thickness of the jelly roll 100 in a width direction by increasing a configuration ratio of the second stack 120 since a thickness, in the width direction, of the second stack including the separator having a Z-folded form is smaller than those of the first and third stacks including the separators having the winding form.

Although not illustrated in FIG. 3, a battery cell for a secondary battery according to an exemplary embodiment of the present invention may be configured to include the stack type jelly roll 100 described above, first and second electrode tabs each connected to the first electrodes 111, 122, and 132 and the second electrodes 112, 121, and 131 of the jelly roll 100, and a case exposing the first and second electrode tabs to the outside thereof and receiving the jelly roll 100 therein.

A battery pack for a secondary battery according to an exemplary embodiment of the present invention may be configured to include a plurality of such battery cells described above, terminals electrically connecting the plurality of battery cells to each other, and a battery case accommodating the plurality of battery cells and the terminals.

Hereinafter, a method of manufacturing the stack type jelly roll for a secondary battery according to the present invention as described above will be described in detail with reference to the drawings.

In FIGS. 4 to 19, side schematic views of a method of manufacturing the stack type jelly roll 100 for according to an exemplary embodiment of the present invention are illustrated.

Figure 4:
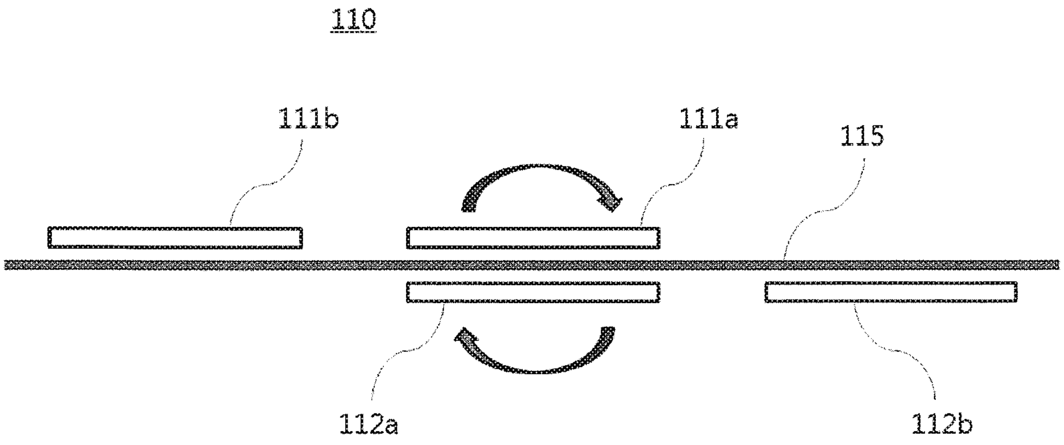
FIGS. 4 to 6 are side schematic views illustrating a method of manufacturing a first stack region according to a first exemplary embodiment of the present invention.
Figure 5:
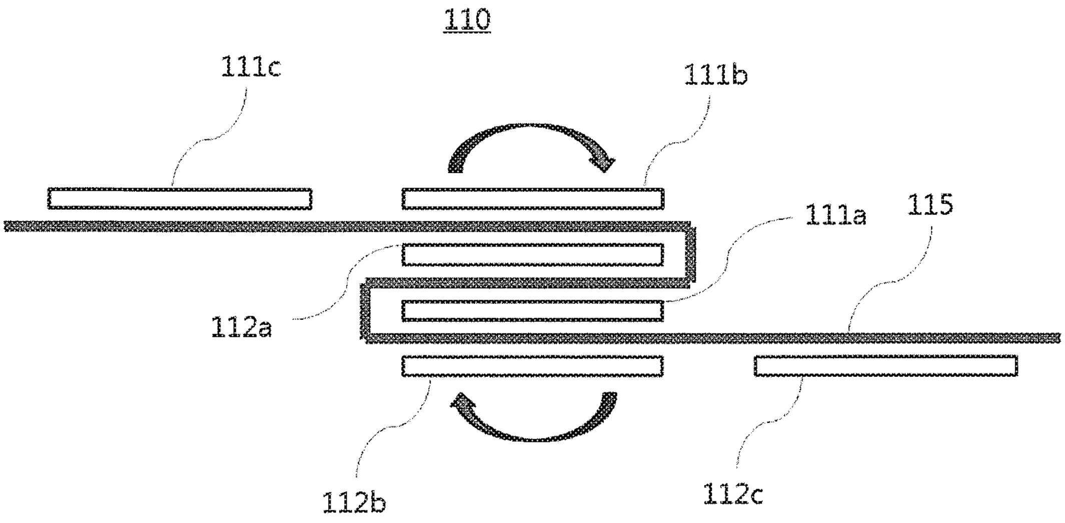
Figure 6:
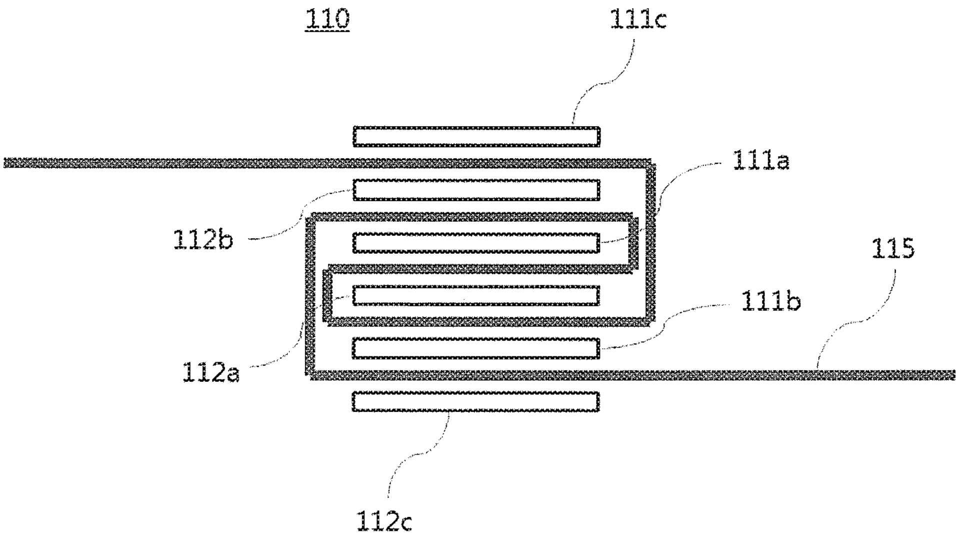

More specifically, in FIGS. 4 to 6, side schematic views of a method of manufacturing a first stack 110 region according to a first exemplary embodiment of the present invention are illustrated, and in FIGS. 7 to 11, side schematic views of a method of manufacturing a first stack 110 region according to a second exemplary embodiment of the present invention are illustrated.

Figure 15:
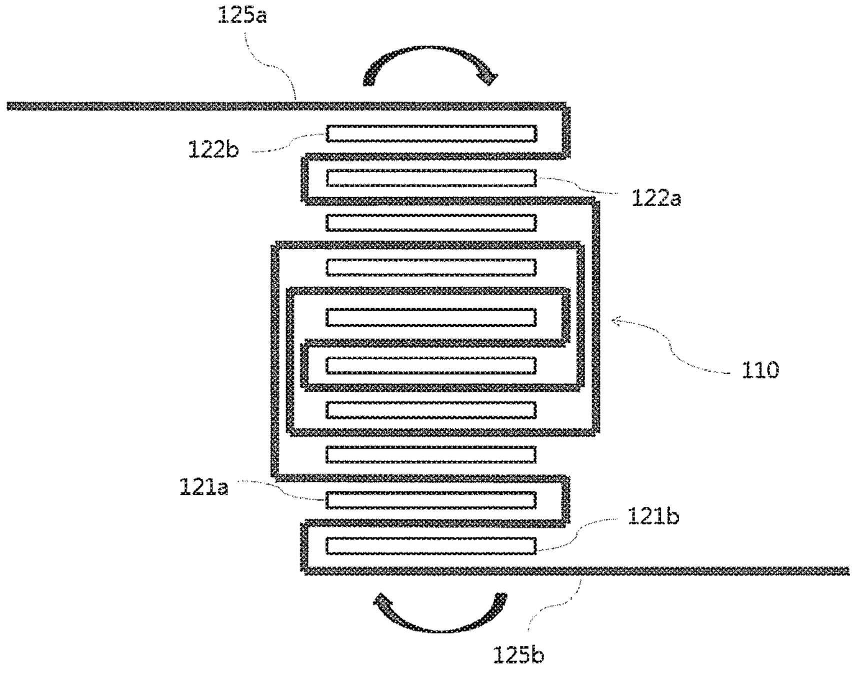
Figure 16:
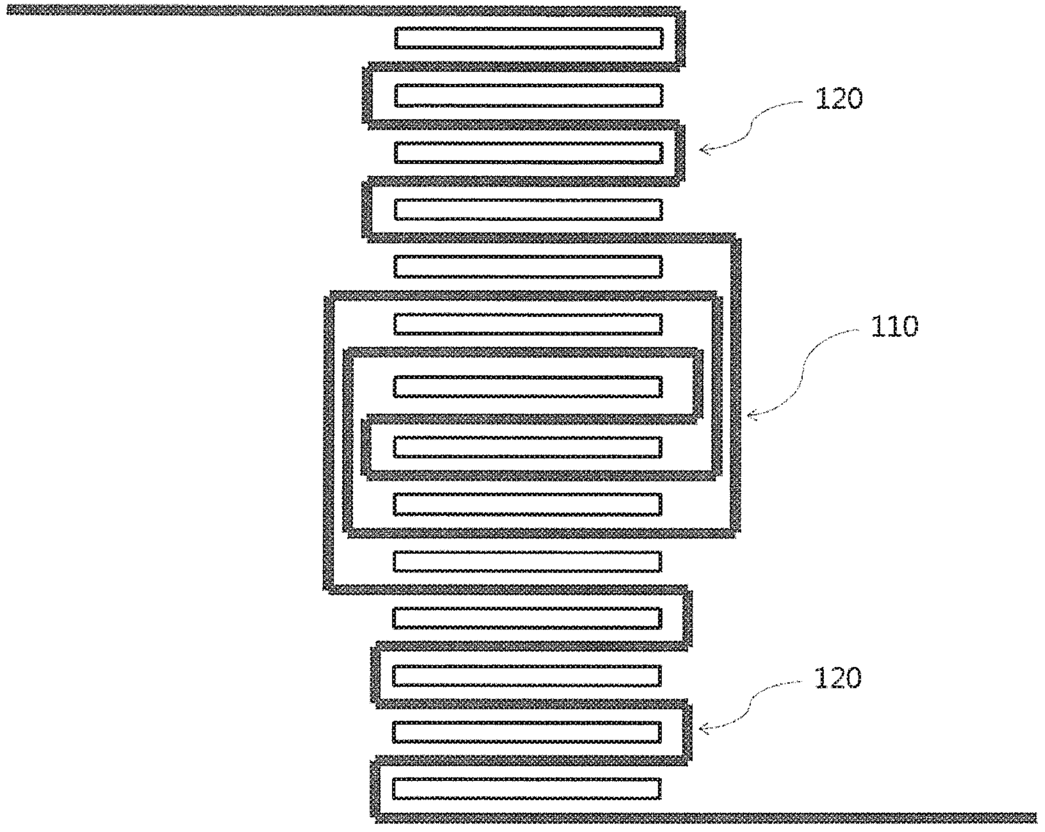
Figure 17:
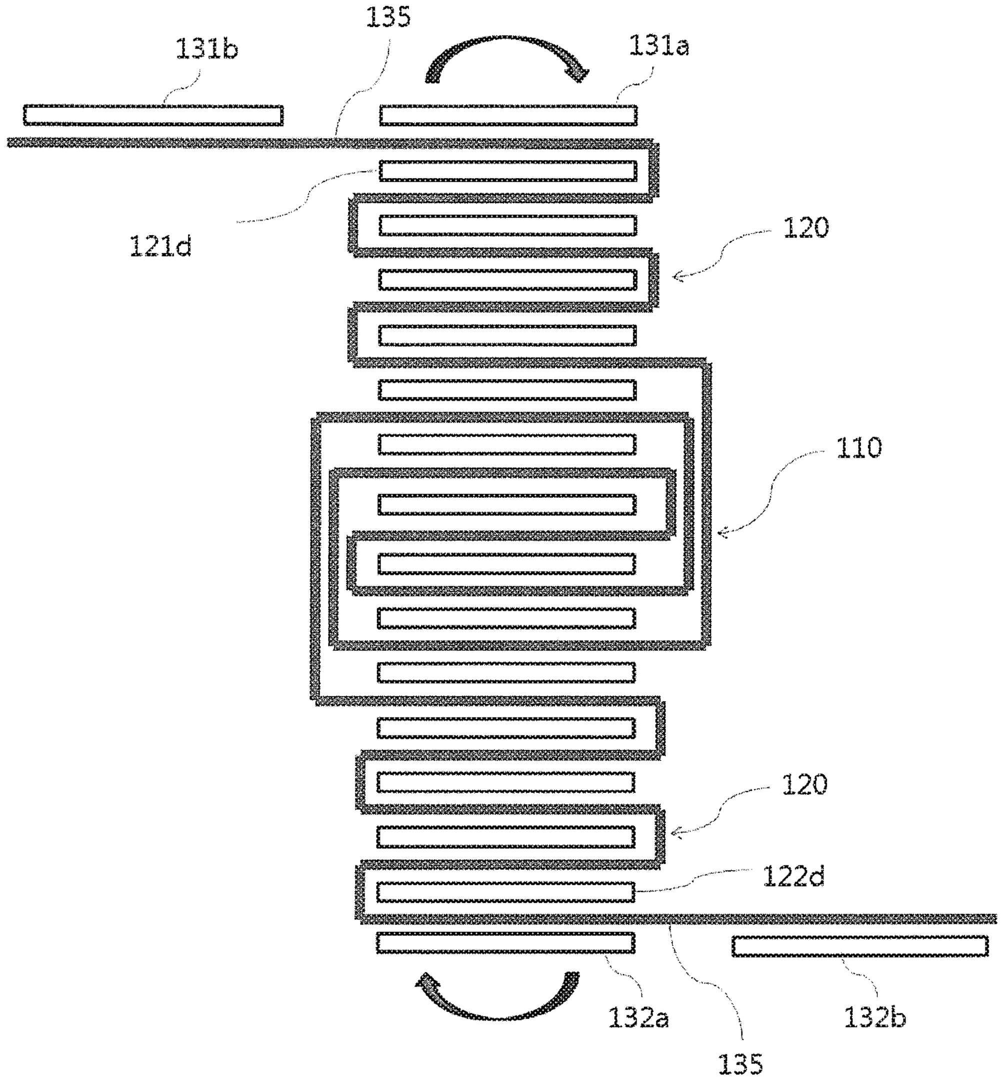
FIGS. 17 to 19 are side schematic views illustrating a method of manufacturing a third stack region according to a first exemplary embodiment.
Figure 18:
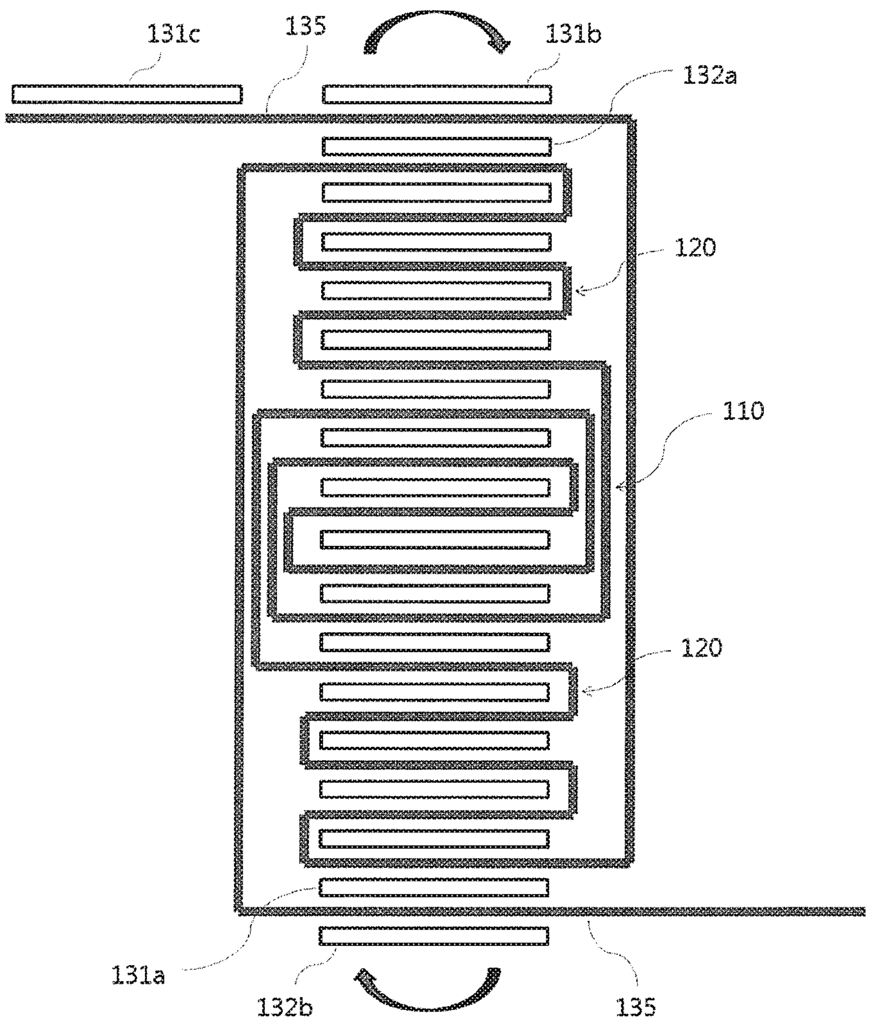
Figure 19:
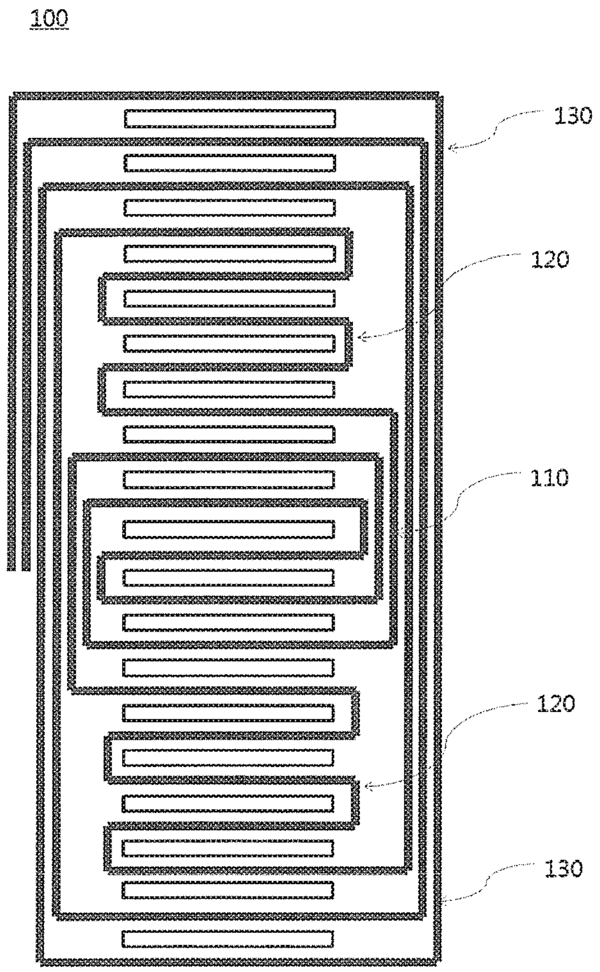

In addition, in FIGS. 12 to 16, side schematic views of a method of manufacturing a second stack 120 region according to an exemplary embodiment of the present invention are illustrated, and in FIGS. 17 to 19, side schematic views of a method of manufacturing a third stack 130 region according to a first exemplary embodiment are illustrated.

The method of manufacturing a first stack 110 region according to a first exemplary embodiment of the present invention will be described. First, as illustrated in FIG. 4, a 1-1a-th electrode 111*a* is disposed on the center of a first separator 115, and a 1-1b-th electrode 111*b* is disposed at one side of the 1-1a-th electrode 111*a* so as to be spaced apart from the 1-1a-th electrode 111*a* by a predetermined distance. In addition, a 2-1a-th electrode 112*a* is disposed beneath the center of the first separator 115 so as to correspond to the 1-1a-th electrode, and a 1-2b-th electrode 112*b* is disposed at the other side of the 2-1a-th electrode 112*a* so as to be spaced apart from the 2-1a-th electrode 112*a* by a predetermined distance. That is, first electrodes are supplied in one side direction of an upper surface of the first separator 115 so as to be spaced apart from each other by a predetermined distance, and second electrodes are supplied in the other side direction of a lower surface of the first separator 115 so as to be spaced apart from each other by a predetermined distance.

As illustrated, the jelly roll 100 is configured so that the separator is supplied in both of one side direction and the other side direction of the 1-1a-th electrode 111*a* and electrodes are stacked in both of one side direction and the other side direction, such that a speed in fixing a stack may be increased.

In addition, the separator is continuously supplied in both directions, and for convenience, a separator constituting the first stack 110 is referred to as a first separator 115, a separator constituting the second stack 120 is referred to as a second separator 125, and a separator constituting the third stack 130 is referred to as a third separator 135.

When the first separator 115 is wound clockwise with respect to the 1-1a-th electrode 111*a* in an arrangement state as illustrated in FIG. 4, a configuration as illustrated in FIG. 5 may be formed.

Referring to FIG. 5, a 1-1c-th electrode 111*c* is disposed at one side of the 1-1b-th electrode 111*b* so as to be spaced apart from the 1-1b-th electrode 111*b* by a predetermined distance. In addition, a 2-1c-th electrode 112*c* is disposed at the other side of the 2-b-th electrode 112*b* so as to be spaced apart from the 2-1b-th electrode 112*b* by a predetermined distance. When the first separator 115 is wound clockwise with respect to the 1-1a-th electrode 111*a* in an arrangement state as illustrated in FIG. 5, a configuration as illustrated in FIG. 6 may be formed.

Referring to FIG. 6, when the first separator 115 is disposed to surround electrodes in a winding form based on the 1-1a-th electrode 111*a* disposed at the center of the jelly roll 100, the 1-2b-th electrode 112*b* and the 1-1c-th electrode 111*c* are disposed above the 1-1a-th electrode 111*a*, and the 2-1a-th electrode 112*a*, the 1-1b-th electrode 111*b*, and the 2-1c-th electrode 112*c* are sequentially disposed below the 1-1a-th electrode 111*a*, a configuration of the first stack 110 is completed.

Figure 7:
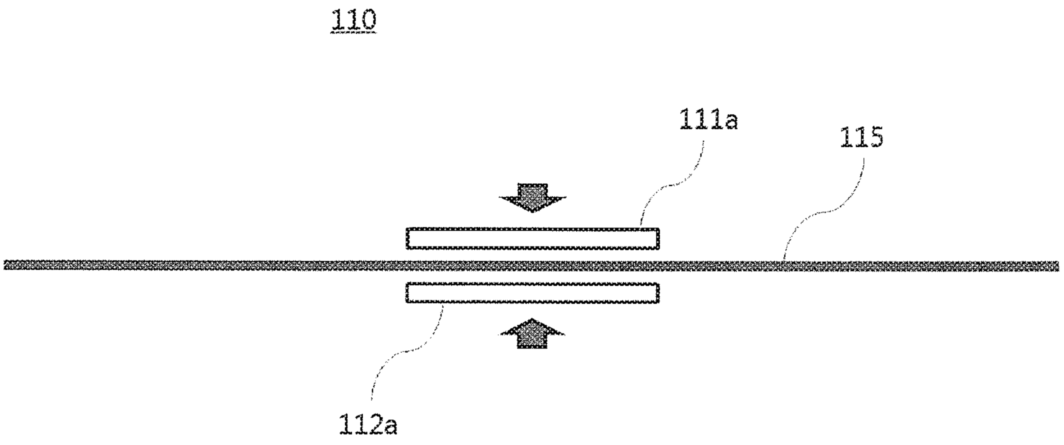
FIGS. 7 to 11 are side schematic views illustrating a method of manufacturing a first stack region according to a second exemplary embodiment of the present invention.

A method of manufacturing a first stack 110 according to a second exemplary embodiment of the present invention as another exemplary embodiment will be described. As illustrated in FIG. 7, a 1-1a-th electrode 111*a* is disposed above a first separator 115 and a 2-1a-th electrode 112*a* is disposed below the first separator 115 so as to correspond to the 1-1a-th electrode 111*a*, with the first separator 115 interposed between the 1-1a-th electrode 111*a* and the 2-1a-th electrode 112*a*.

In this case, the separator is continuously supplied in both directions, and for convenience, a separator constituting the first stack 110 is referred to as a first separator 115, a separator constituting the second stack 120 is referred to as a second separator 125, and a separator constituting the third stack 130 is referred to as a third separator 135.

Figure 8:
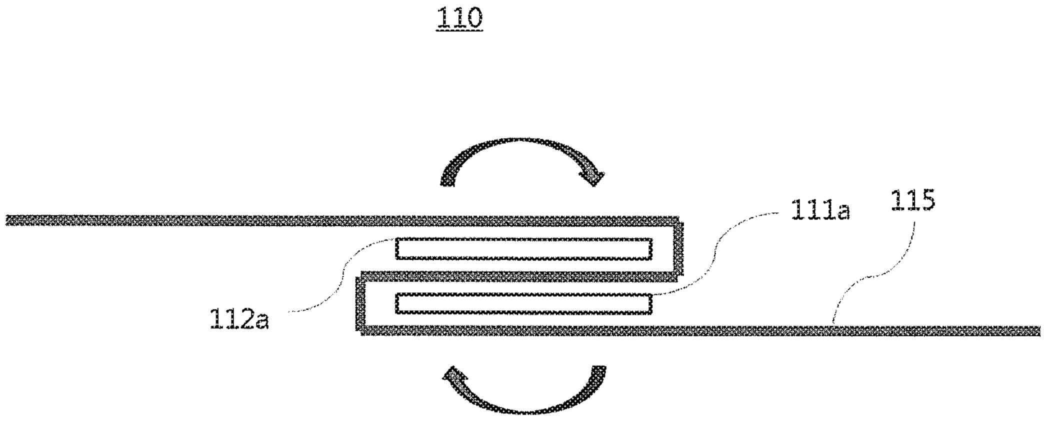

When the first separator 115 is wound clockwise with respect to the 1-1a-th electrode 111*a* in an arrangement state as illustrated in FIG. 7, a configuration as illustrated in FIG. 8 may be formed.

Next, referring to FIG. 9, a 1-1b-th electrode 111*b* is disposed above the wound 2-1a-th electrode 112*a* with the first separator 115 interposed therebetween, and a 2-1b-th electrode 112*b* is disposed below the 1-1a-th electrode 111*a* with the first separator 115 interposed therebetween.

Figure 9:
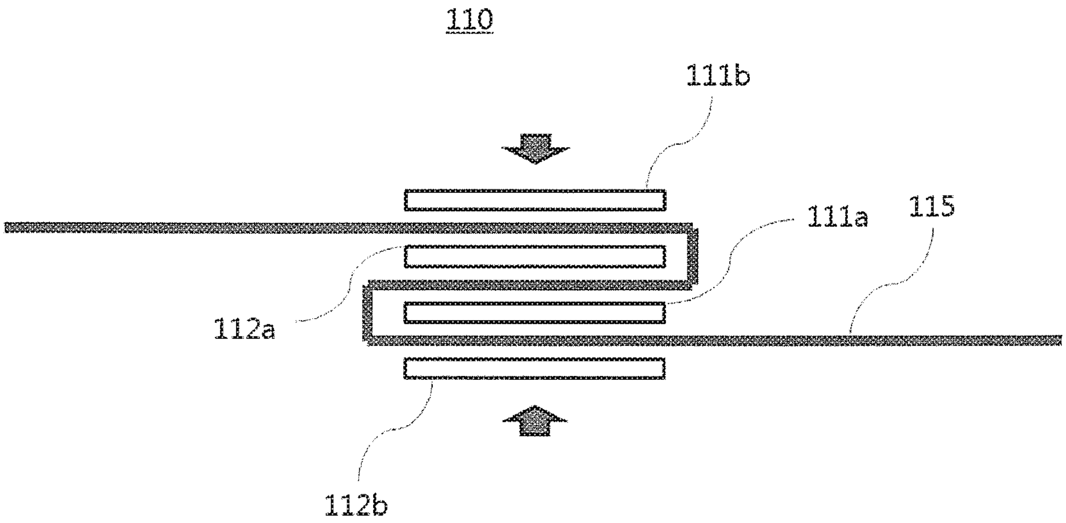
Figure 10:
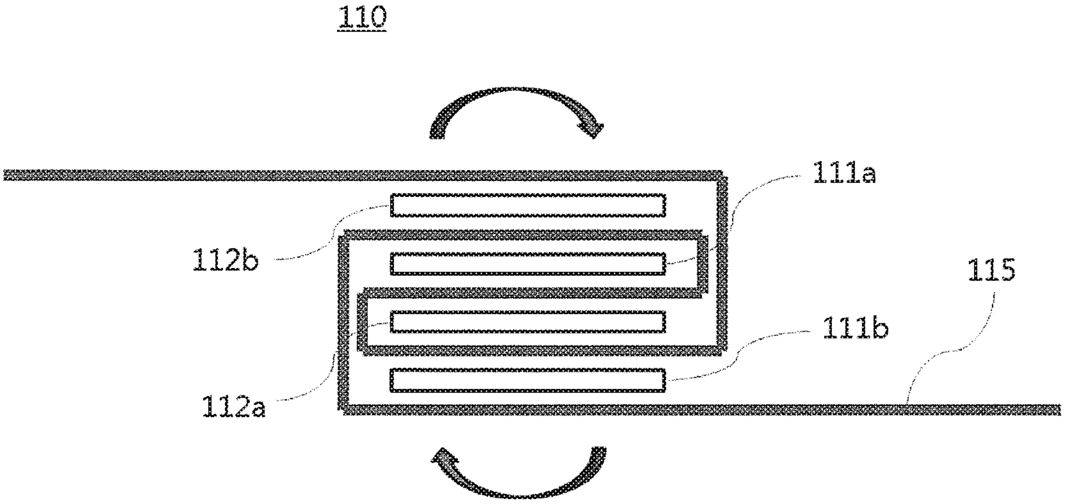

When the first separator 115 is wound clockwise with respect to the 1-1a-th electrode 111*a* in an arrangement state as illustrated in FIG. 9, a configuration as illustrated in FIG. 10 may be formed.

Figure 11:
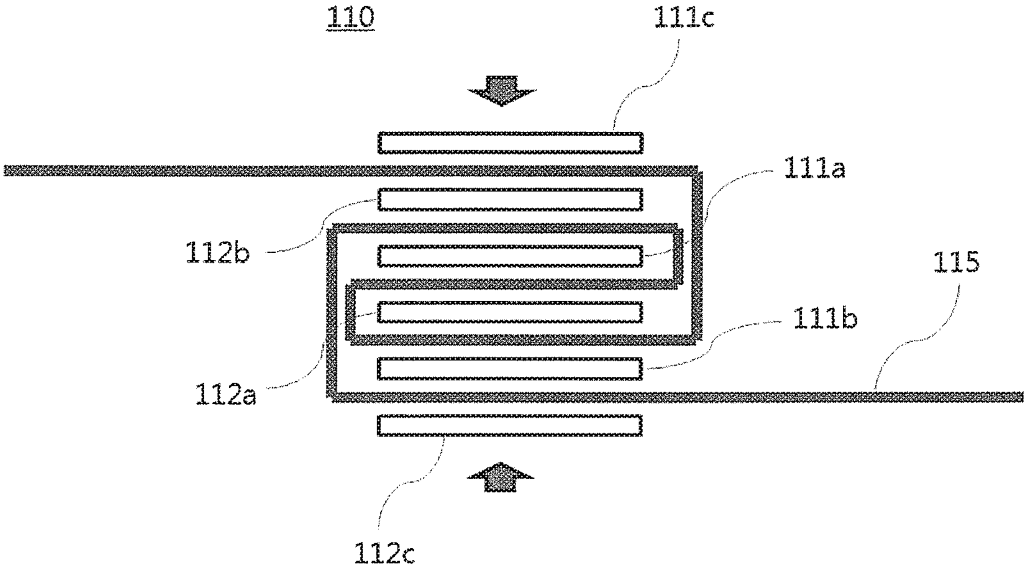

Next, referring to FIG. 11, a 1-1c-th electrode 111*c* is disposed above the wound 2-1b-th electrode 112*b* with the first separator 115 interposed therebetween, and a 2-1c-th electrode 112*c* is disposed below the 1-1b-th electrode 111*b* with the first separator 115 interposed therebetween. A configuration of the first stack 110 is completed through the configuration as described above.

Next, a method of manufacturing a second stack 120 region according to an exemplary embodiment of the present invention will be described with reference to FIGS. 12 to 16.

Figure 12:
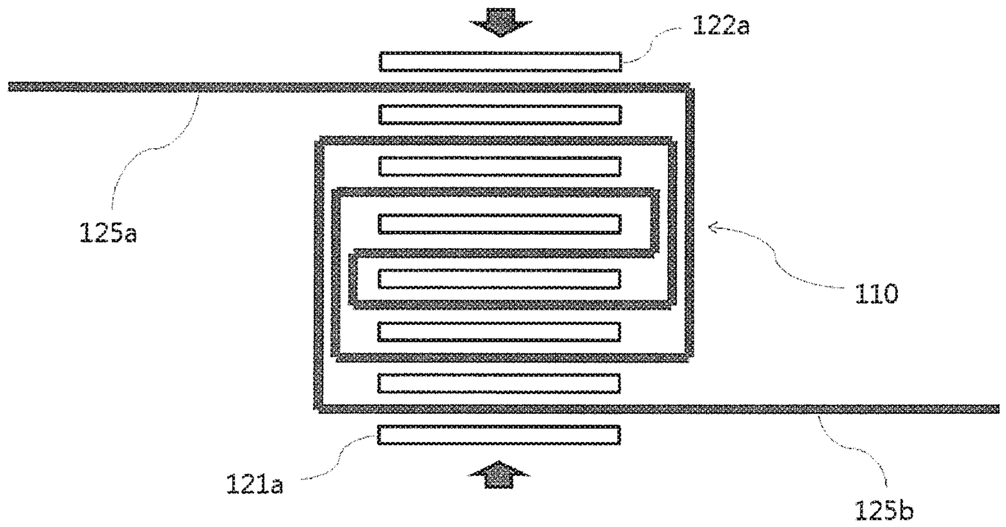
FIGS. 12 to 16 are side schematic views illustrating a method of manufacturing a second stack region according to an exemplary embodiment of the present invention.

Referring to FIG. 12, when a separator positioned above the first stack 110 in a second separator 125 is defined as a 2-1-th separator 125*a* and a separator positioned below the first stack 110 in the second separator 125 is defined as a 2-2-th separator 125*b*, a 2-2a-th electrode 122*a* is disposed above the 2-1-th separator 125*a* positioned above the first stack 110, and a 2-1a-th electrode 121*a* is disposed above the 2-2-th separator 125*b* positioned below the first stack 110.

Figure 13:
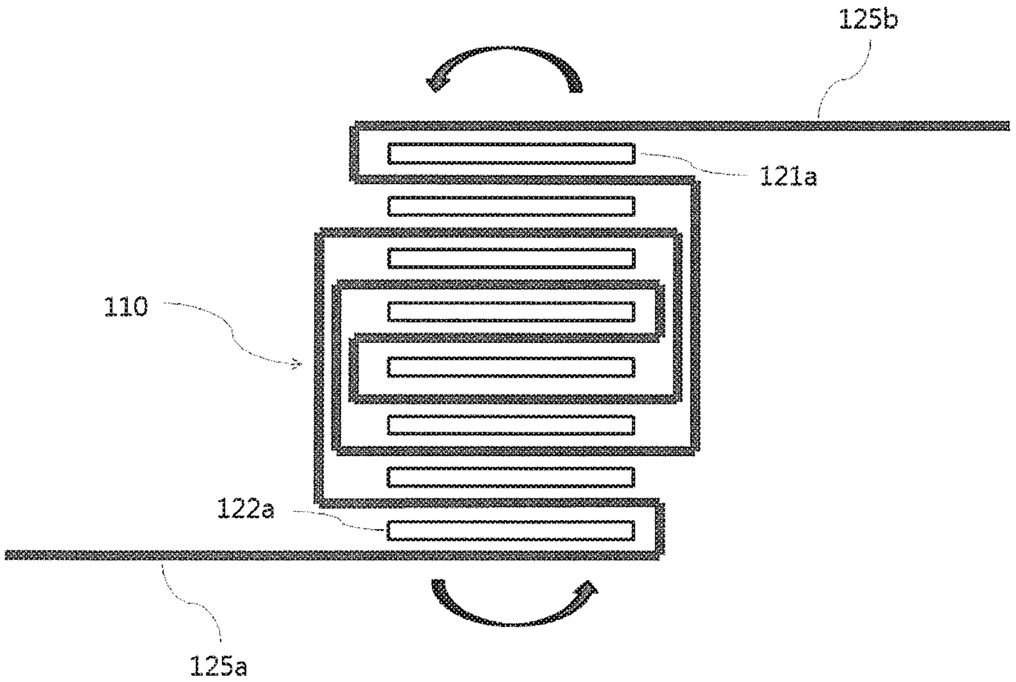

Next, when the second separators 125*a* and 125*b* are wound counterclockwise with respect to the first stack 110 in an arrangement state as illustrated in FIG. 12, a configuration as illustrated in FIG. 13 may be formed. That is, the second separators 125*a* and 125*b* are wound in an opposite direction to a winding direction of the first stack 110 to start the manufacture of the second stack 120.

Next, referring to FIG. 14, a 1-2b-th electrode 121*b* is disposed above the wound 2-1a-th electrode 121*a* with the 2-2-th separator 125*b* interposed therebetween, and a 2-2b-th electrode 122*b* is disposed below the 2-2a-th electrode 122*a* with the 2-1-th separator 125*a* interposed therebetween.

Figure 14:
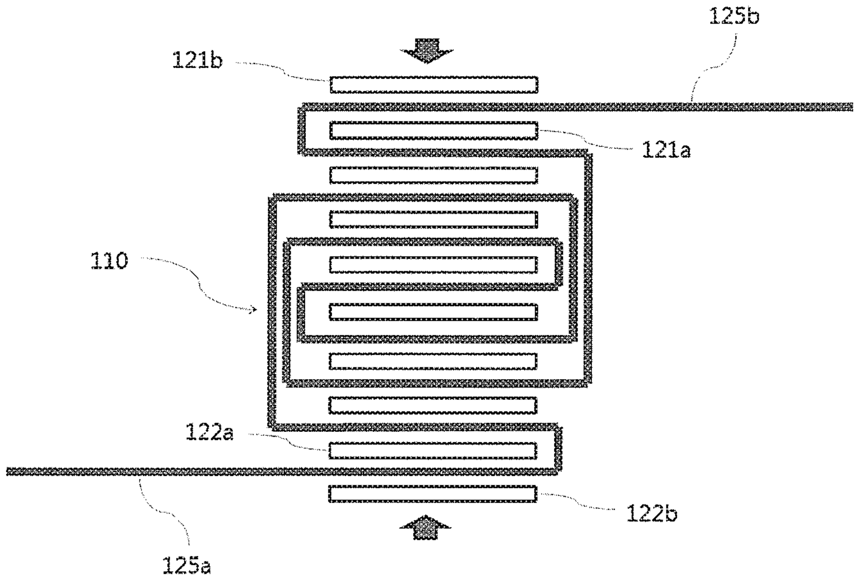

When the second separators 125*a* and 125*b* are wound clockwise with respect to the first stack 110 in an arrangement state as illustrated in FIG. 14, a configuration as illustrated in FIG. 15 may be formed. That is, when a winding direction is again reversed, the separator has a Z-folding form. That is, the second stack 120 has a Z-folding form by disposing the electrodes and then alternately performing winding in a clockwise direction and a counterclockwise direction.

When the processes described above are repeated, a configuration of the second stack 120 as illustrated in FIG. 16 is completed.

The same exemplary embodiment as that of the method of manufacturing a first stack 110 according to a first exemplary embodiment is hereinafter described with respect to a method of manufacturing a third stack 130, but the method of manufacturing a first stack 110 according to a second exemplary embodiment described above may also be applied.

Next, referring to FIG. 17, a 2-3a-th electrode 131*a* is disposed above a 1-2d-th separator 121*d* with a third separator 135 interposed therebetween, and a 2-3b-th electrode 131*b* is disposed at one side of the 2-3a-th electrode 131*a* so as to be spaced apart from the 2-3a-th electrode 131*a* by a predetermined distance. In addition, a 1-3a-th electrode 132*a* is disposed below a 2-2d-th electrode 122*d* with a third separator 135 interposed therebetween, and a 1-3b-th electrode 132*b* is disposed at the other side of the 1-3a-th electrode 132*a* so as to be spaced apart from the 1-3a-th electrode 132*a* by a predetermined distance.

When the third separator 135 is wound clockwise with respect to the 1-1a-th electrode 111*a* in an arrangement state as illustrated in FIG. 17, a configuration as illustrated in FIG. 18 may be formed.

Next, referring to FIG. 18, a 2-3c-th electrode 131*c* is finally disposed at one side of the 2-3b-th electrode 131*b* so as to be spaced apart from the 2-3b-th electrode 131*b* by a predetermined distance. When the third separator 135 is wound clockwise with respect to the 1-1a-th electrode 111*a* in an arrangement state as illustrated in FIG. 18, the stack type jelly roll 100 for a secondary battery according to an exemplary embodiment of the present invention as illustrated in FIG. 19 is completed.

In the stack type jelly roll for a secondary battery having the configuration as described above and the method of manufacturing the same, the center and the outer side of the cell stack are configured in the winding form, such that an alignment level between the electrodes at the time of stacking the electrodes may be improved, and a defective rate may be minimized through firm finishing of the stack type jelly roll.

In addition, a portion between the center and the outer side of the cell stack is configured in a Z-folding cell stack form, such that a thickness of the side surfaces of the stack type jelly roll due to winding of the separator is reduced. Therefore, an energy density is increased, and an amount of used separator is decreased, such that a resource is decreased and productivity is improved.

Further, since the stack type jelly roll is manufactured using a jelly roll structure in which the separator may be supplied in both directions based on the center of the cell stack as a basic structure, a speed of a stacking process may be increased, such that the productivity is further improved.

The present invention is not to be construed as being limited to the exemplary embodiment described above. The present invention may be applied to various fields and may be variously modified by those skilled in the art without departing from the scope of the present invention claimed in the claims. Therefore, it is obvious to those skilled in the art that these alterations and modifications fall in the scope of the present invention.

[Detailed Description of Main Elements]

| | |
|---|---|
| 100: cell stack | |
| 110: first stack | 111: 1-1-th electrode |
| 112: 2-1-th electrode | 115: first separator |
| 120: second stack | 121: 1-2-th electrode |
| 122: 2-2-th electrode | 125: second separator |
| 130: third stack | 131: 1-3-th electrode |
| 132: 2-3-th electrode | 135: third separator |

What is claimed is:

1. A stack type jelly roll electrode assembly for a secondary battery, comprising:

a first stack of electrodes formed at a predetermined region from a center to an outer side and including a 1-1-th electrode which is any one of a cathode and an anode, a 2-1-th electrode which is the other of the cathode and the anode;

a pair of second stacks of electrodes formed at a predetermined region from one side and an opposite side of the first stack to an outer side, respectively and including a 1-2-th electrode which is any one of a cathode and an anode, a 2-2-th electrode which is the other of the cathode and the anode;

a third stack of electrodes formed from an outermost side of either one of the second stacks of electrodes to an outermost side of the stack type jelly roll and including a 1-3-th electrode which is any one of a cathode and an anode, a 2-3-th electrode which is the other of the cathode and the anode; and a single continuous separator passing around an entire periphery of the stack type jelly roll electrode assembly to form a single separator loop and also passing between each pair of adjacent electrodes only once in a continuous form, wherein the separator has a winding form in passing through each pair of adjacent electrodes in the first stack of electrodes, wherein the separator has a form folded in a Z shape in passing through each pair of adjacent electrodes in the second stacks of electrodes, wherein the separator surrounds the outermost side of the third stack of electrodes in a winding form, wherein the separator of the second stack of electrodes formed at the outside from one side of the first stack of electrodes and the separator of the second stack of electrodes formed at the outside from the opposite side of the first stack of electrodes are point symmetrically formed with respect to a center of the first stack of electrodes, wherein an electrodes number of the second stack of electrodes is greater than an electrodes number of the first stack of electrodes, and wherein the single continuous separator is continuously formed so as to take the winding form in the first stack of electrodes, the Z-shape form in the second stacks of electrodes, and again the winding form in the third stack of the electrodes.

2. The stack type jelly roll for a secondary battery of claim 1, wherein the first stack is configured by performing winding based on a 1-1-th electrode disposed at a center of the separator in a state where a plurality of 1-1-th electrodes are disposed on one side of an upper surface of the separator so as to be spaced apart from each other by a predetermined distance and a plurality of 2-1-th electrodes are disposed on the other side of a lower surface of the separator so as to be spaced apart from each other by a predetermined distance.

3. The stack type jelly roll for a secondary battery of claim 1, wherein the first stack is configured by once or more performing a process of winding the separator in a state where the 1-1-th electrode is disposed on an upper surface of the separator and the 2-1-th electrode is disposed on a lower surface of the separator.

4. The stack type jelly roll for a secondary battery of claim 2, wherein a thickness of each of the pair of second stacks in a stack direction is larger than or equal to the sum of thicknesses of the first stack and the third stack in the stack direction.

5. The stack type jelly roll for a secondary battery of claim 2, wherein the third stack is configured by performing winding based on a 1-3-th electrode disposed at a center of the third separator in a state where a plurality of 1-3-th electrodes are disposed on one side of an upper surface of the third separator so as to be spaced apart from each other by a predetermined distance and a plurality of 2-3-th electrodes are disposed on the other side of a lower surface of the third separator so as to be spaced apart from each other by a predetermined distance, and the 2-3-th electrode is disposed at an outermost side of the third stack.

6. A battery cell including the stack type jelly roll for a secondary battery of claim 1.

7. A battery pack including the stack type jelly roll for a secondary battery of claim 1.

8. The stack type jelly roll for a secondary battery of claim 1, wherein a stacking direction thickness of the second stack of electrodes is greater than a sum of stacking direction thicknesses of the first stack of electrodes and the third stack of electrodes.

* * * * *